(12) United States Patent
Kohler et al.

(10) Patent No.: US 6,873,434 B1
(45) Date of Patent: Mar. 29, 2005

(54) COLOR MANAGEMENT OF BLACK DATA (75) Inventors: Timothy L. Kohler, San Jose, CA (US); Todd D. Newman, Palo Alto, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/571,975

(22) Filed: May 16, 2000

(51) Int. Cl.[7] .............................. G06K 9/00; G03F 3/08
(52) U.S. Cl. ..................... 358/1.9; 358/518; 358/502; 382/162; 382/165
(58) Field of Search ........................ 358/1.9, 518, 500, 358/502, 515, 529, 530; 382/162, 165

(56) References Cited

U.S. PATENT DOCUMENTS

| | | | |
|---|---|---|---|
| 5,008,742 A | 4/1991 | Shigaki et al. ............... | 358/79 |
| 5,329,385 A | 7/1994 | Washio ....................... | 358/515 |
| 5,331,440 A | 7/1994 | Kita et al. .................. | 358/529 |
| 5,359,436 A | 10/1994 | Dichter et al. .............. | 358/500 |
| 5,473,446 A | 12/1995 | Perumal, Jr. et al. ........ | 358/523 |
| 5,502,579 A | 3/1996 | Kita et al. .................. | 358/518 |
| 5,528,386 A | 6/1996 | Rolleston et al. ............ | 358/522 |
| 5,710,824 A | 1/1998 | Mongeon ..................... | 382/162 |
| 5,719,956 A | 2/1998 | Ogatsu et al. ............... | 382/167 |
| 5,739,917 A | 4/1998 | Shu et al. ................... | 358/298 |
| 5,764,795 A | 6/1998 | Takeo et al. ................. | 382/167 |
| 5,774,238 A | 6/1998 | Tsukada ...................... | 358/529 |
| 5,778,160 A | * 7/1998 | Smith ........................ | 358/1.9 |
| 5,917,994 A | 6/1999 | Perumal, Jr. et al. ........ | 395/109 |
| 5,978,107 A | * 11/1999 | Murai et al. ................. | 358/520 |
| 5,999,703 A | 12/1999 | Schwartz et al. ............ | 395/109 |
| 6,002,806 A | 12/1999 | Morikawa ................... | 382/274 |

OTHER PUBLICATIONS

"File Format for Color Profiles", International Color Consortium® Specification ICC.1:1998–09, © 1998.

Gary G. Field, "Color and Its Reproduction", Graphic Arts Technical Foundation, pp., 239–241, 341, 351, 354, © 1988.

"About black generation and separation types" from Adobe PhotoShop 4.0 online help, Mar. 2000.

"Adjusting the black generation and separation types" from Adobe PhotoShop 4.0 online help, Mar. 2000.

* cited by examiner

*Primary Examiner*—Kimberly Williams
*Assistant Examiner*—Thomas J Lett
(74) *Attorney, Agent, or Firm*—Fitzpatrick, Cella, Harper & Scinto (57) ABSTRACT

Managing color data to transform CMYK source color data from a source device into CMYK destination color data for rendering by a destination device, the CMYK source color data and the CMYK destination color data being comprised of color pixels represented by cyan (C), magenta (M), yellow (Y) and black (K) values, in which a source color profile and a destination color profile are accessed, the source color profile containing a source color transform and the destination color profile containing a destination color transform. A determination is made, for each pixel of the CMYK source color data, whether the pixel has a non-zero C, M or Y value. In a case that a pixel is determined to not have a non-zero C, M or Y value, the CMYK source color data corresponding to the pixel is set into the CMYK destination color data, and in a case that a pixel is determined to have a non-zero C, M or Y value, the CMYK source color data corresponding to the pixel is transformed from a source device color space into CMYK destination color data in a destination device color space. In the transforming step, the source color transform is applied to the CMYK source color data corresponding to the pixel to generate device-independent color data in a device-independent color space, and the destination color transform is applied to the device-independent color data to generate the CMYK destination color data.

10 Claims, 7 Drawing Sheets

COLOR MANAGEMENT OF BLACK DATA

BACKGROUND OF THE INVENTION

1. Field of the Invention

The present invention relates to a color management system for transforming source color data in a CMYK source (cyan, magenta, yellow and black) color space into destination color data in a CMYK destination color space, wherein the color management system exempts CMYK color data from the transformation sequence if the C, M and Y values of the CMYK color data are each equal to zero, regardless of the K value. In such a case, the CMYK color data is passed directly to the destination color data without modification.

2. Description of the Related Art

Color management systems are used for transforming color image data from the color space of an input device, such as a digital camera or scanner, to the color space of an output device, such as a printer or monitor. Generally, in color management systems such as the system of the International Color Consortium (ICC), the component colors of source color data are first transformed from a device-dependent color space for the source device into a device-independent profile connection space (PCS), such as CIELAB color space or a perceptual color space. The color data is then transformed from the PCS color space into a device-dependent color space for the destination device. For example, RGB color data from a color monitor is transformed into CIELAB color space and is then transformed from the CIELAB color space into the destination CMYK color space for a color printer.

Such color management systems generally produce desirable results and are able to match colors accurately when viewed on, or acquired by, different devices. However, many times, particularly in color proofing operations, it is desirable to transform color image data from a source CMYK color space to a destination CMYK color space, such as from the color space of one type of color printer to the color space of another type of color printer. In such situations, it may be desirable to avoid performing color management on portions of the source CMYK color data that have no color components.

For example, a portion of an image may be comprised only of black text or black lines. The portion may be represented in the source CMYK data by using only the K component, and not the C, M or Y components. For example, it is often desirable to instruct a printer to use only black ink to render a portion of an image which contains only black text or black lines. Normal processing of such an image portion by a color management system may result in some or all of the portion being represented in the CMYK destination color data by the C, M and/or Y components; not just the K component. This is because there are many possible CMYK combinations that a color management system may utilize in an attempt to reproduce the appearance of the original black. For example, some black inks have a slight color hue, such as blue or red. In such a case, a color management system may attempt to recreate the appearance of the slight color hue of the black ink by adding a C, M and/or Y component, instead of using just K. It should be appreciated that the combination necessary to achieve an acceptable black appearance is very delicate, and if the combination is not correct, a brownish, muddy appearance can result. Furthermore, the printing of black text and/or other objects with fine detail using multiple colors of inks can result in blurred text and/or objects due to slight errors in alignment while printing.

The transformation of the K component of CMYK source color data into the C, M and Y components of CMYK destination color data can occur when the color management system being used applies a different technique to represent black image portions than that of the color system which created the CMYK source color data. For example, the color system that generated the CMYK source color data may have used a particular black generation algorithm, such as undercolor removal, to represent the black image portions, but the color management system used to generate the CMYK destination data may apply a different black generation algorithm, such as gray component replacement. Such a color management system will transform portions of the CMYK source color data that contain zero values for the C, M and Y components into CMYK destination color data that contain non-zero values for the C, M and Y components. As discussed above, this can result in an undesirable appearance of black text and lines which were intended to be rendered by black ink (K) only.

Thus, existing color management systems often result in a problematic appearance of the image rendered on the destination device due to the introduction of an undesirable color cast and of unwanted color components when converting from CMYK source color data to CMYK destination color data. This can cause portions of the image that were meant to be achromatic to have an undesirable chromatic appearance.

SUMMARY OF THE INVENTION

The present invention addresses the foregoing problems by providing a color management system in which CMYK color data from a CMYK source color space is transformed into CMYK destination color data in a CMYK destination color space, without transforming those portions of the CMYK source color data for which the values of the C, M and Y components are each equal to zero. The direct pass-through of such achromatic pixel data from the CMYK source color data to the CMYK destination color data ensures that only black ink is used by the destination device to generate the black, gray and white color pixels represented by only the K component in the CMYK source color data. This preservation is especially advantageous for data representing black text and/or black lines, so that the black text and/or lines exhibit reduced blurriness and/or color imbalance which can arise when using conventional color management systems.

The present invention addresses the foregoing problems by providing a color management system in which the representation of achromatic pixels (pixels having zero values for the C, M and Y components) in the CMYK source color data is preserved in the CMYK destination color data. The data representing such achromatic pixels circumvents the transformation sequence and is set directly into the CMYK destination color data without transformation or modification.

According to one aspect of the invention, a color management system is provided for managing color data to transform CMYK source color data from a source device into CMYK destination color data for rendering by a destination device, the CMYK source color data and the CMYK destination color data being comprised of pixels represented by cyan (C), magenta (M), yellow (Y) and black (K) values. The color management system determines, for each pixel of the CMYK source color data, whether the pixel represents an achromatic color (C=M=Y=0) by determining whether or not the pixel has a non-zero C, M, or Y value. In a case that a pixel is determined to be achromatic (not having a non-zero C, M or Y value), the CMYK source color data corresponding to the pixel is set into the CMYK destination color data. In a case that a pixel is determined to not be achromatic (having a non-zero C, M or Y value), the CMYK source color data corresponding to the pixel is transformed from a source device color space into CMYK destination color data in a destination device color space.

Preferably, the determination of whether or not a color pixel is an achromatic pixel (C=M=Y=0) is made by inspecting the CMYK source color data on a pixel-by-pixel basis. The CMYK data representing the achromatic pixels is preferably set directly into the CMYK destination color data as each color pixel of the CMYK source color data is processed, and is thereby prevented from passing through the normal transformation sequence. Also, the transformations used in the transformation sequence are preferably performed using color transforms obtained from color profiles corresponding to the source device and the destination device, respectively. Although the above aspect of the invention has been described with respect to CMYK-based color systems, it can appreciated that the invention can also be used with other color systems having a K component, such as CMYOGK (cyan, magenta, yellow, orange, green and black).

By virtue of this arrangement, a color management system is provided whereby the data representing achromatic pixels in the CMYK source color data is simply bypassed around the transformation sequence that is normally used for transforming CMYK source color data into CMYK destination color data, and is instead set directly into the CMYK destination color data. The color management system thereby preserves the original representation of such achromatic pixels (e.g. black, gray and white) so that they are only represented by the "K" channel in the CMYK destination color data. In this manner, the black, gray and white components are represented in the same way in the CMYK destination color data as they are in the CMYK source color data.

According to another aspect of the invention, a color management system is provided for managing color data to transform CMYK source color data from a source device into CMYK destination color data for rendering by a destination device, the CMYK source color data and the CMYK destination color data being comprised of color pixels represented by cyan (C), magenta (M), yellow (Y) and black (K) values. A source color profile and a destination color profile are accessed, the source color profile containing a source color transform and the destination color profile containing a destination color transform. A determination is made, for each pixel of the CMYK source color data, whether the pixel represents an achromatic color (C=M=Y=0) by determining whether or not the pixel has a non-zero C, M or Y value. In a case that a pixel is determined to be achromatic, the CMYK source color data corresponding to the pixel is set into the CMYK destination color data. In a case that a pixel is determined to not be achromatic (C, M or Y is non-zero), the CMYK source color data corresponding to the pixel is transformed from a source device color space into CMYK destination color data in a destination device color space. In the transforming step, the source color transform is applied to the CMYK source color data corresponding to the pixel to generate device-independent color data in a device-independent color space, and the destination color transform is applied to the device-independent color data to generate the CMYK destination color data.

Preferably, the determination of whether a color pixel is achromatic (C=M=Y=0) is made by inspecting the CMYK source color data on a pixel-by-pixel basis. The CMYK data representing the achromatic pixels is preferably set directly into the CMYK destination color data as each color pixel of the CMYK source color data is processed, and is thereby prevented from passing through the normal transformation sequence. Although the above aspect of the invention has been described with respect to CMYK-based color systems, it can appreciated that the invention can also be used with other color systems having a K component, such as CMYOGK (cyan, magenta, yellow, orange, green and black).

By virtue of this arrangement, a color management system is provided whereby the data representing achromatic pixels in the CMYK source color data is simply bypassed around the transformation sequence that is normally used for transforming CMYK source color data into CMYK destination color data, and is instead set directly into the CMYK destination color data. The color management system thereby preserves the original representation of such achromatic pixels (e.g. black, gray and white) so that they are only represented by the "K" channel in the CMYK destination color data. In this manner, the black, gray and white components are represented in the same way in the CMYK destination color data as they are in the CMYK source color data.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a color management system for managing color data representing an image from a first color space corresponding to one device, into a second color space corresponding to another device. Specifically, the color management system of the present invention preserves the representation of achromatic pixels (pixels having zero values for the C, M and Y components) in the CMYK source color data during transformation into CMYK destination color data. The color data representing such achromatic pixels circumvents the normal color transformation sequence and is set directly into the CMYK destination color data without color transformation or modification.

The color management system according to the present invention may be incorporated in an output device driver for execution in a computing device, such as a printer driver, embedded in the firmware of an output device, such as a printer, or provided in a stand-alone color management application for use on a general purpose computer. It can be appreciated that the present invention is not limited to these embodiments and that the present invention may be used in other environments in which color management is used.

Figure 1:
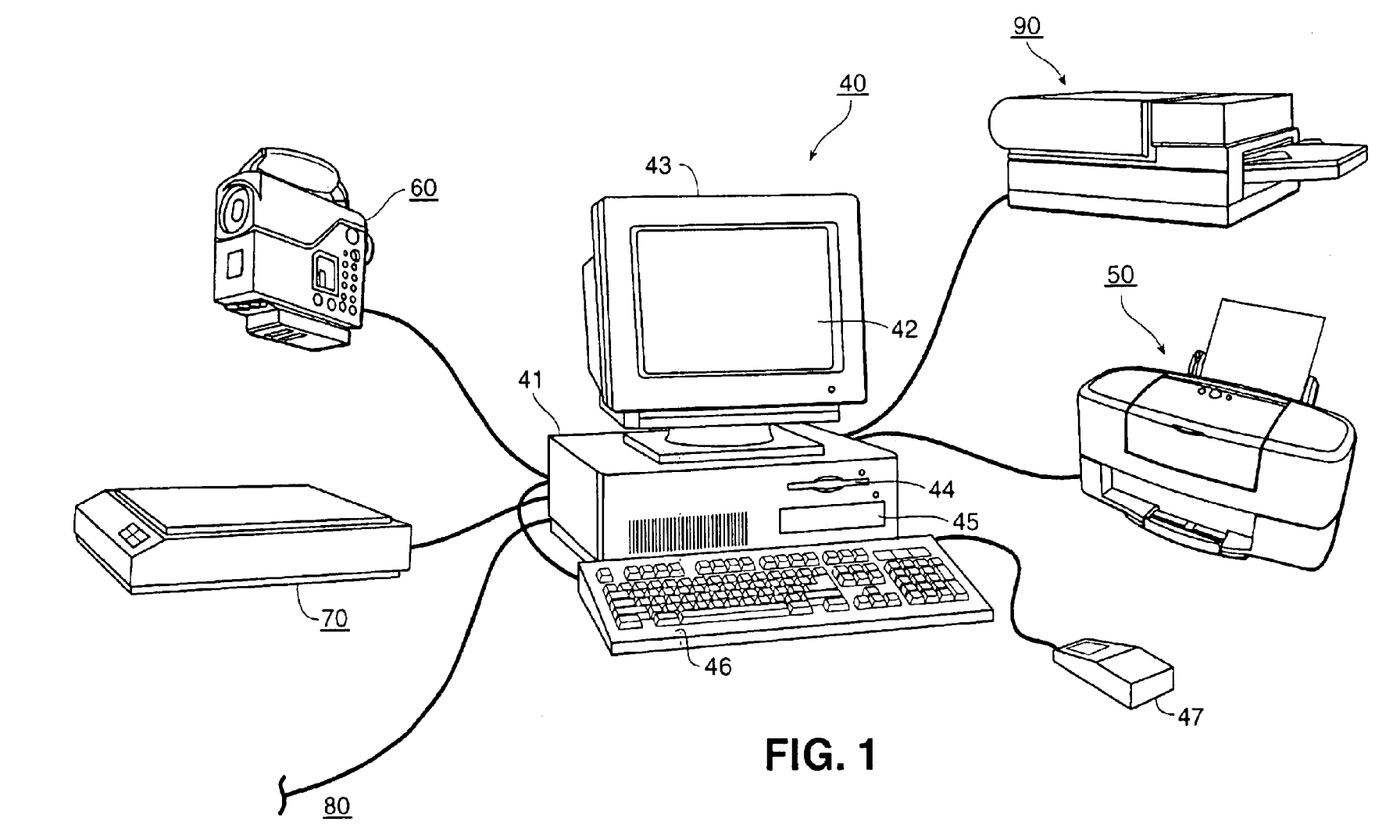
FIG. 1 is a representative view of a computer system in which the present invention may be implemented.

FIG. 1 is a view showing the outward appearance of a representative computing system including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a first printer, preferably a color bubble jet printer, which forms color images on a recording medium such as paper or transparencies or the like. Printer 90 is a second printer, preferably an ink laser printer, which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other printers that use such colorant combinations, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 2:
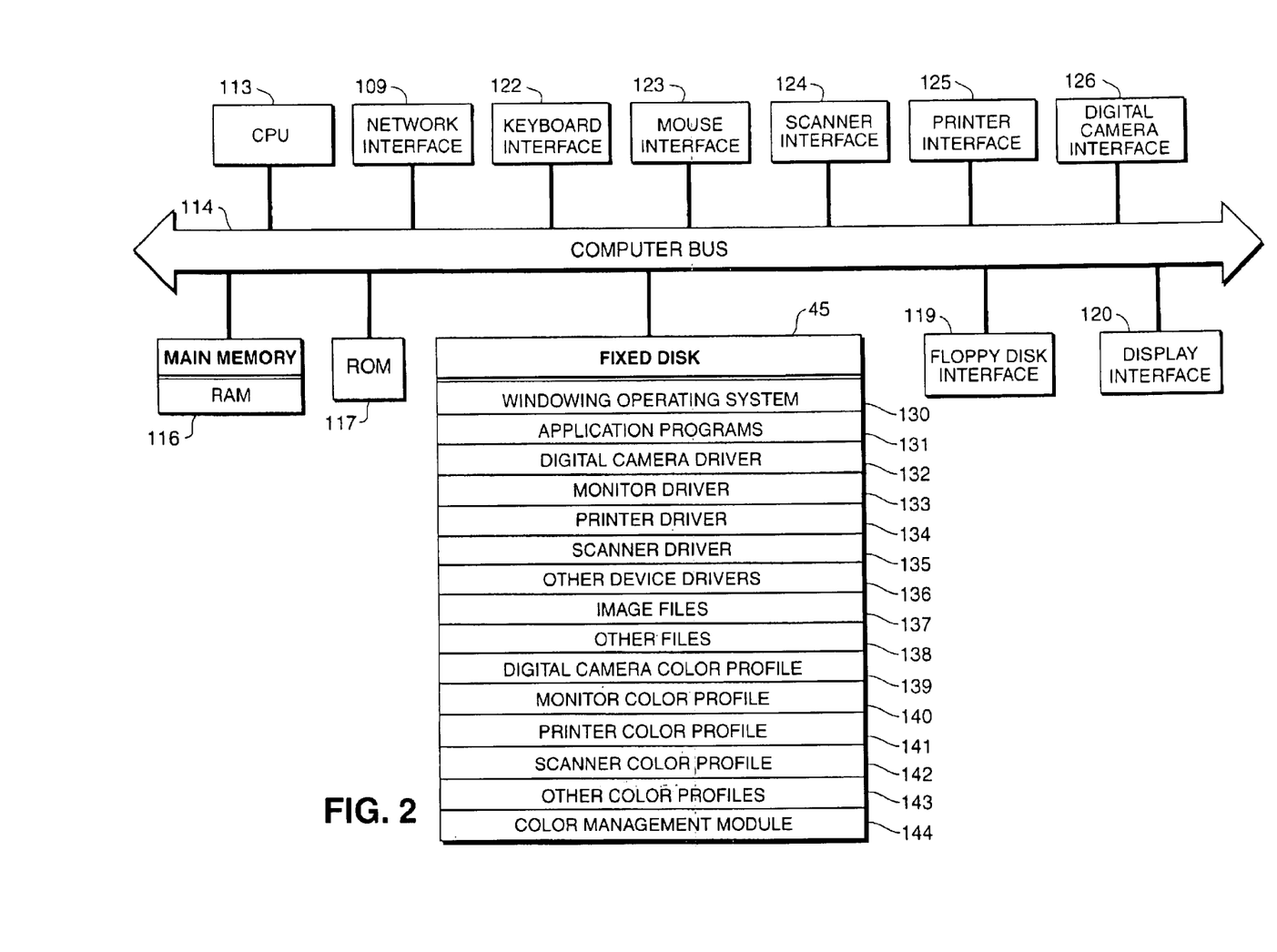
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50 and/or printer 90, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windowing operating system although other operating systems may be used, application programs 131, such as image processing applications that include a color management module, and plural device drivers, including a digital camera driver 132, monitor driver 133, printer driver 134, scanner driver 135, and other device drivers 136. Fixed disk 45 also includes image files 137, other files 138, digital camera color profile 139 for digital camera 60, monitor color profile 140 for monitor 43, printer color profile 141 for printer 50, scanner color profile 142 for scanner 70, and other color profiles 143 for other devices and peripherals (not shown). The present invention is preferably performed by computer-executable process steps which are stored on fixed disk 45 for execution by CPU 113, either as an integrated part of a device driver, such as printer driver 134, or as one of application programs 131 for performing image processing. In this regard, fixed disk 45 further includes color management module (CMM) 144 which is a program comprised of computer-executable process steps for implementing the present invention.

Figure 3:
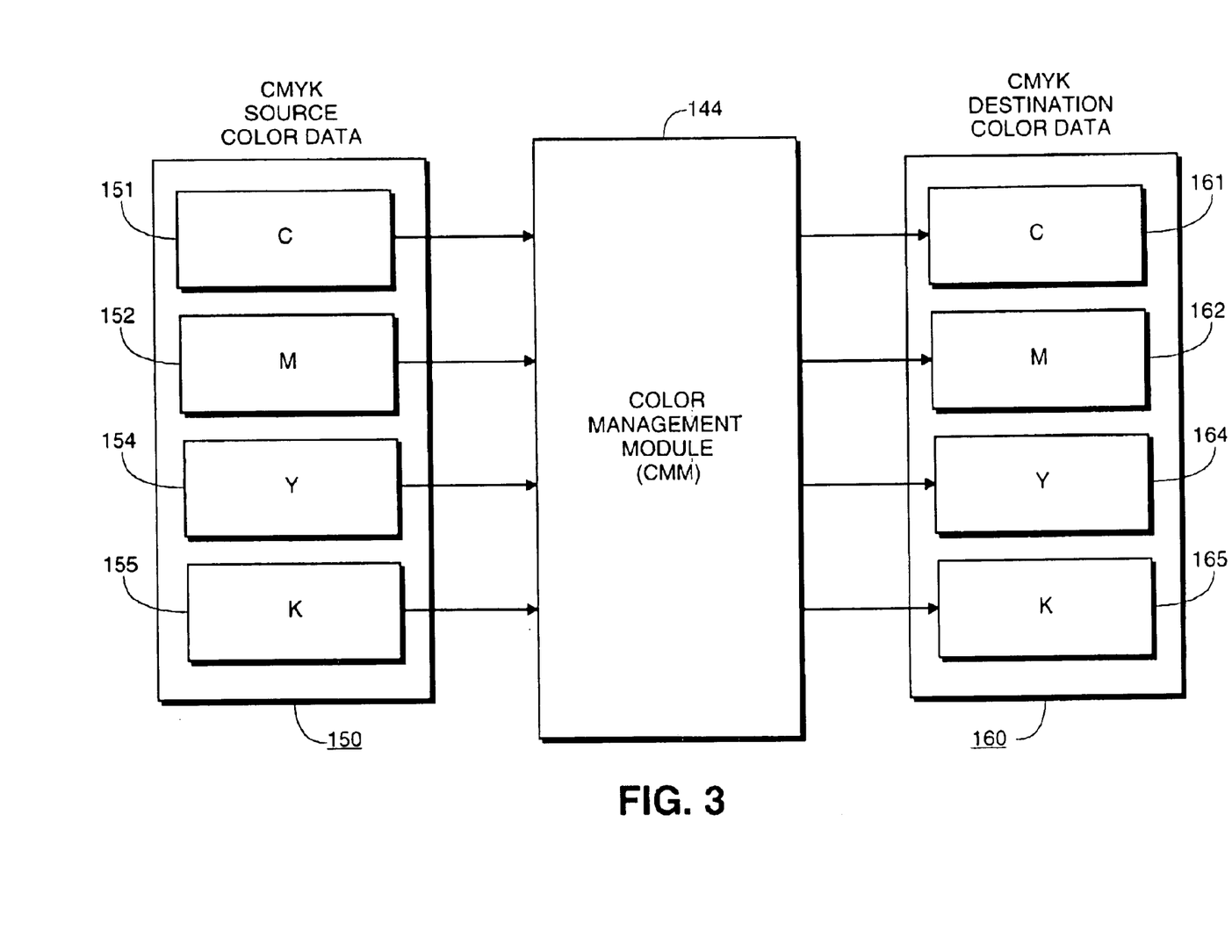
FIG. 3 is a view for providing a general, system level explanation of a color management system according to the present invention.

Turning to FIG. 3, a general, system level view is provided for explaining the application of a color management system to CMYK source color data according to the present invention. As seen in FIG. 3, the color management system is implemented in color management module (CMM) 144. CMM 144 is applied to CMYK source color data 150 in order to generate CMYK destination color data 160. Specifically, CMYK source color data 150 includes cyan color component 151, magenta color component 152, yellow color component 154 and black color component 155. Each of the aforementioned color components is represented by a value ranging from zero percent to 100 percent. In this manner, each pixel of a color image can be represented by a CMYK combination, wherein the value of each color component of the color combination represents the amount to which that color component contributes to the color appearance of the pixel.

In general, CMM 144 inspects the values of each of the color components of CMYK source color data 150 and determines if the color components represent an achromatic pixel, wherein the C, M and Y components are each equal to zero. For example, CMM 144 inspects C color component 151, M color component 152 and Y color component 154. If each of the three aforementioned color components are equal to zero then the pixel is determined to be achromatic. If the pixel is determined not to be achromatic, then CMM 144 performs normal color management transformation processing to CMYK source color data 150 corresponding to the pixel in order to generate CMYK destination color data 160. If the pixel is determined to be achromatic (C=M=Y= 0), then the CMYK source color data for that pixel is not transformed, but is instead passed around the color management transformation sequence and placed into CMYK destination color data 160. In this manner, pixels of CMYK source color data 150 which are represented by only the K color component 155 are not color transformed, but are maintained in a consistent manner during the conversion to the color space of the destination device. The present invention therefore avoids unwanted color hues and color characteristics from being introduced into black, gray and/or white pixel data, when rendering a color image from a source device on a destination device. Specifically, the present invention reduces the presence of blurriness and unwanted color appearance in black text and objects, such as lines.

Figure 4:
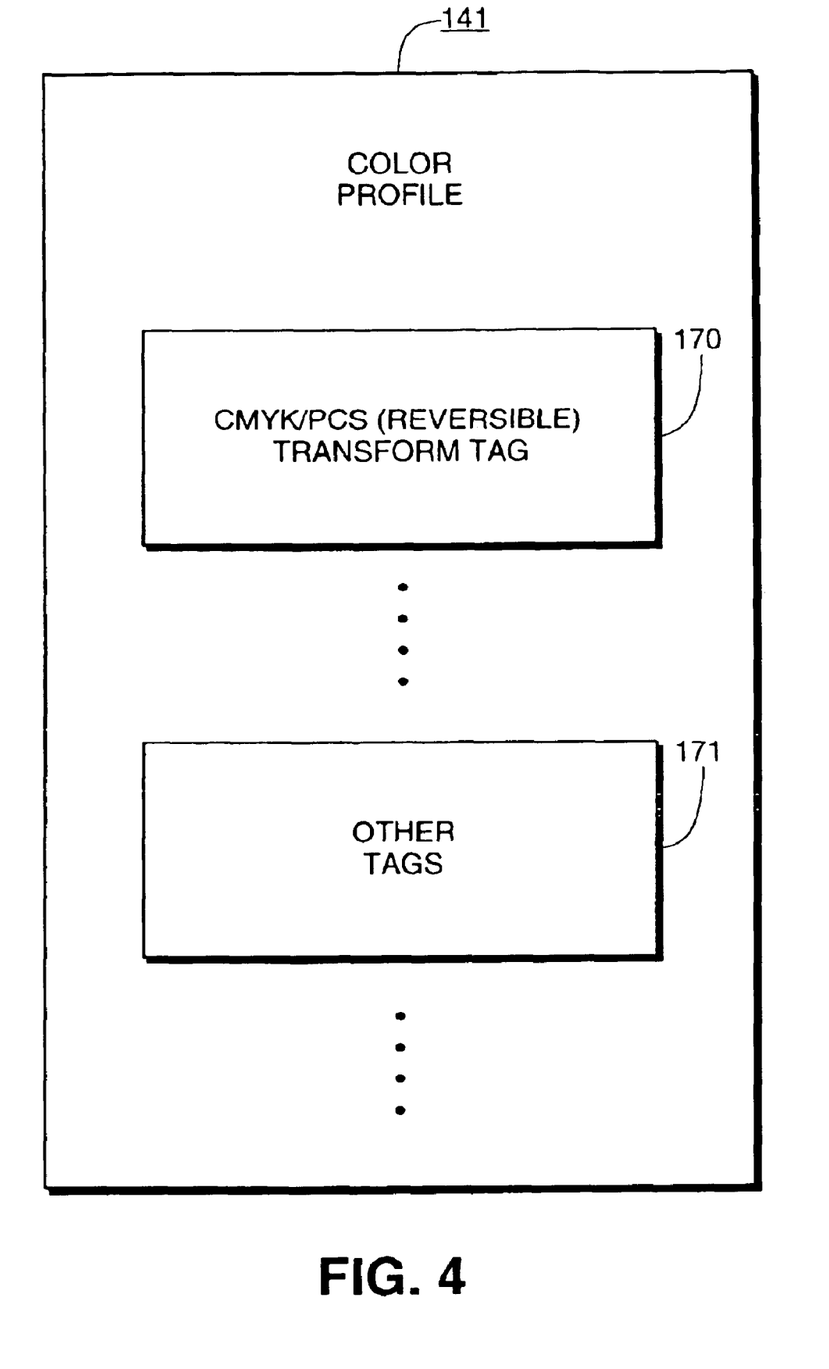
FIG. 4 is a view for providing an explanation of a color profile according to one embodiment of the invention.

FIG. 4 provides a view for explaining a color profile for use in a color management system according to the present invention. In general, color profiles are used in the color management of color image data in order to provide color characteristic data corresponding to a color device so that the color image data can be appropriately transformed from one color device to another. More specifically, one color profile is typically maintained for each color device, wherein the color profile contains data characterizing the color space of the color device, as well as data regarding other color characteristics of the color device. A profile-based color management system therefore typically accesses the color profile corresponding to the source device from which the color image data was obtained, and also accesses the color profile corresponding to the destination device to which the color image data will be sent for rendering. The color characteristic data from the two profiles is then utilized to form an appropriate color management transformation sequence to transform the color image data for desired rendering by the destination device.

As can be seen in FIG. 4, printer color profile 141 is a formatted data file for access and use by a color management system. Preferably, color profile 141 corresponds to a particular device, such as printer 50 or printer 90, and is formatted according to a predetermined, standardized format. One such standardized format is developed and maintained by the International Color Consortium (ICC), thereby making such color profiles generally accessible and usable by various different color management systems. As in the ICC format, color profile 141 of FIG. 4 is comprised of tags to represent various relevant pieces of information for access and use by a color management system. Specifically, color profile 141 includes transform tag 170, as well as other tags 171 which may include other information such as gamut mapping data and the like.

Transform tag 170 is preferably composed of a transform, or transformation sequence, which is used to transform CMYK color data to profile connection space (PCS) color data, which is in a device-independent color space. The PCS is generally used as an interim color space by a color management system for subsequent transformation of color data to a color space corresponding to another device, such as a particular destination device. Preferably, according to the present invention, the CMYK/PCS transform is reversible such that the transform data contained in transform tag 170 can be used to transform from CMYK to PCS color space, and also to go from PCS to CMYK color space. In this manner, the necessary color transform, and other information, corresponding to a particular source device are conveniently packaged in a standardized format for use by a color management system. Similar color profiles for other color devices, such as another printer, are also maintained for access and use by the color management system.

Figure 5:
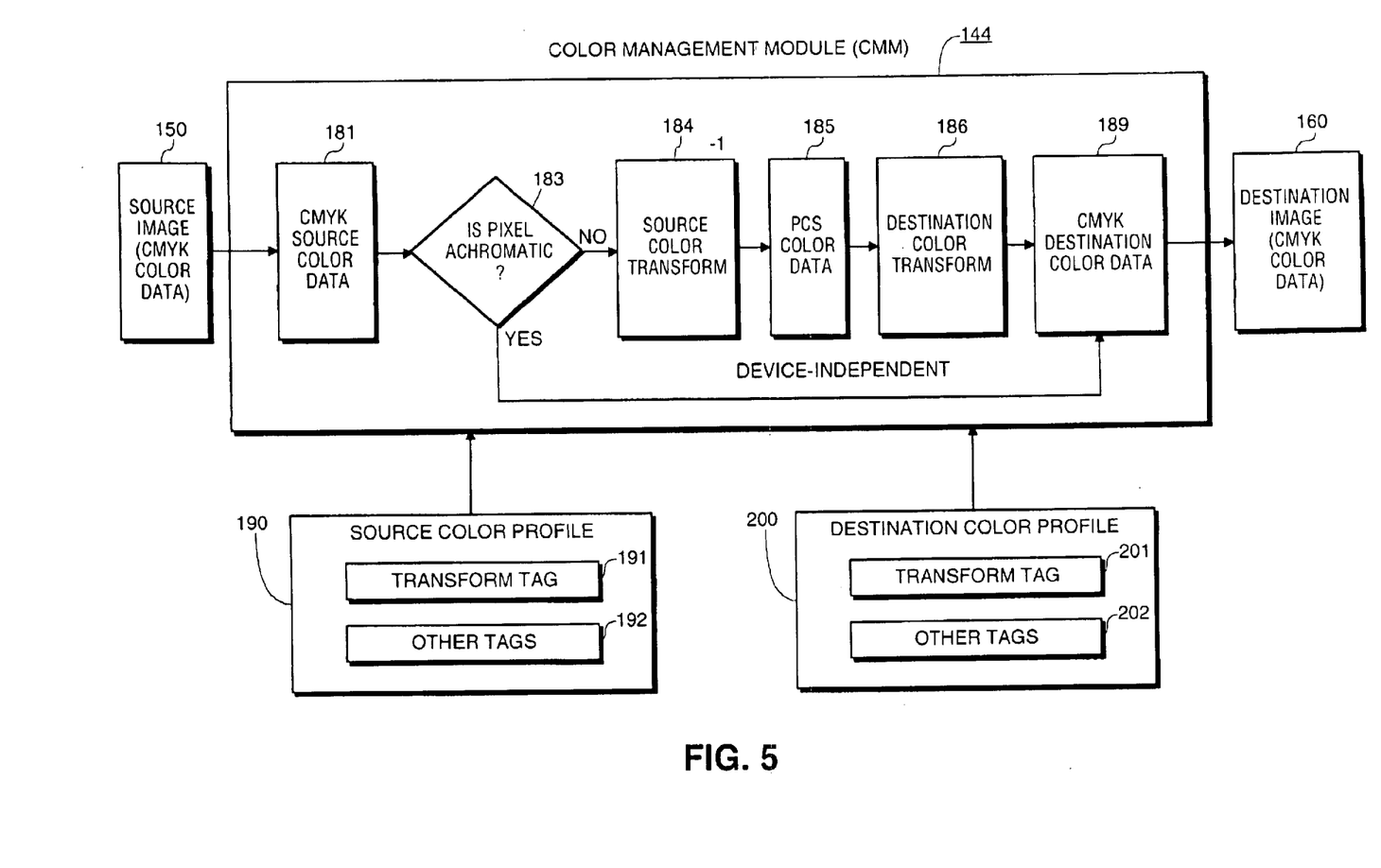
FIG. 5 is a view for providing a system level explanation of a color management system according to the present invention.

FIG. 5 provides a system level block diagram for explaining a transformation sequence performed by a color management module according to the present invention. As can be seen in FIG. 5, source CMYK color data 150 is input to a color management module 144 for generating CMYK destination color data 160. Color management module 144 therefore is used to transform CMYK color data from a color space corresponding to a first device, such as printer 50, into CMYK color data corresponding to a second device, such as printer 90. It can therefore be appreciated that the present invention is advantageous in color transformation sequences used for proofing the appearance of a color image on one printer as it would appear on a second printer, both of which use is C, M, Y and K colorants to render an image.

As also depicted in FIG. 5, color management module 144 utilizes two color profiles to perform the transformation sequence; source color profile 190 and destination color profile 200. Each of these color profiles comprises a transform tag and other tags 171 as described above with respect to FIG. 4. Specifically, source color profile 190 is a color profile corresponding to a source device for which CMYK source color data 150 was generated. For example, CMYK source color data 150 is provided in a color space corresponding to a source device such as printer 50. In such an example, it is desired to transform CMYK source color data 150 into CMYK destination color data 160 for rendering on a destination device, such as printer 90, thereby allowing improved proofing of a color image on a second printer as it would appear on a first printer.

Source color profile 190 contains transform tag 191 which, as discussed above with respect to FIG. 4, refers to or contains a color transform, or transformation sequence, which is used to transform color data from the CMYK color space of the source device into a device-dependent profile connection space (PCS). In a similar manner, destination color profile 200 contains transform tag 201 and other tags 202, as described above with respect to FIG. 4, and corresponds to a destination device, such as printer 90.

Turning to the transformation sequence of FIG. 5, it can be seen that color management module 144 accesses CMYK source color data 181 for processing in order to generate CMYK destination color data 160. A determination 183 is made whether the pixel of CMYK source color data 181 being processed is achromatic. That is, as explained is above with respect to FIG. 3, each of the C, M and Y color components of the pixel is inspected to determine if each color component is equal to zero (C=M=Y=0). If the pixel is determined to be zero, the CMYK source color data 181 for that pixel is not color transformed by the normal transformation sequence, but is passed around the transformation sequence and set directly into CMYK destination color data 189. The present invention therefore preserves an accurate and consistent representation of those pixels of the color image that are represented by only the K color component when rendered by the source and destination devices.

If the pixel is determined to not be achromatic (where any of C, M or Y is non-zero) the color management module (CMM) 144 accesses source transform tag 191 of source color profile 190 to obtain source color transform 184 for transforming CMYK source color data 181 of the non-achromatic pixel into profile connection space (PCS) color data 185. As previously mentioned, PCS color data 185 is an intermediate, device-independent color space. CMM 144 then accesses destination color profile 200 to obtain destination color transform 186 from destination transform tag 201. Destination color transform 186 is used to transform PCS color data 185 of the non-achromatic pixel into CMYK destination color data 189. In this manner, non-achromatic pixels of CMYK source color data color data 181 are transformed into C, M, Y and K color components in the color space of a destination device, such as printer 90.

CMYK destination color data 189 therefore contains both directly set achromatic pixel data which bypassed the transformation sequence, and non-achromatic pixel data which was processed by the normal transformation sequence. CMYK destination color data 189 is thereupon output to CMYK destination color data 160 for rendering by a destination device, such as printer 90. In this manner, the appearance of black, white and gray aspects of the color image which were represented by only the K color component is consistently maintained when being rendered by the destination device in a same technique as the source device, thereby resulting in improved proofing of the color image.

Figure 6:
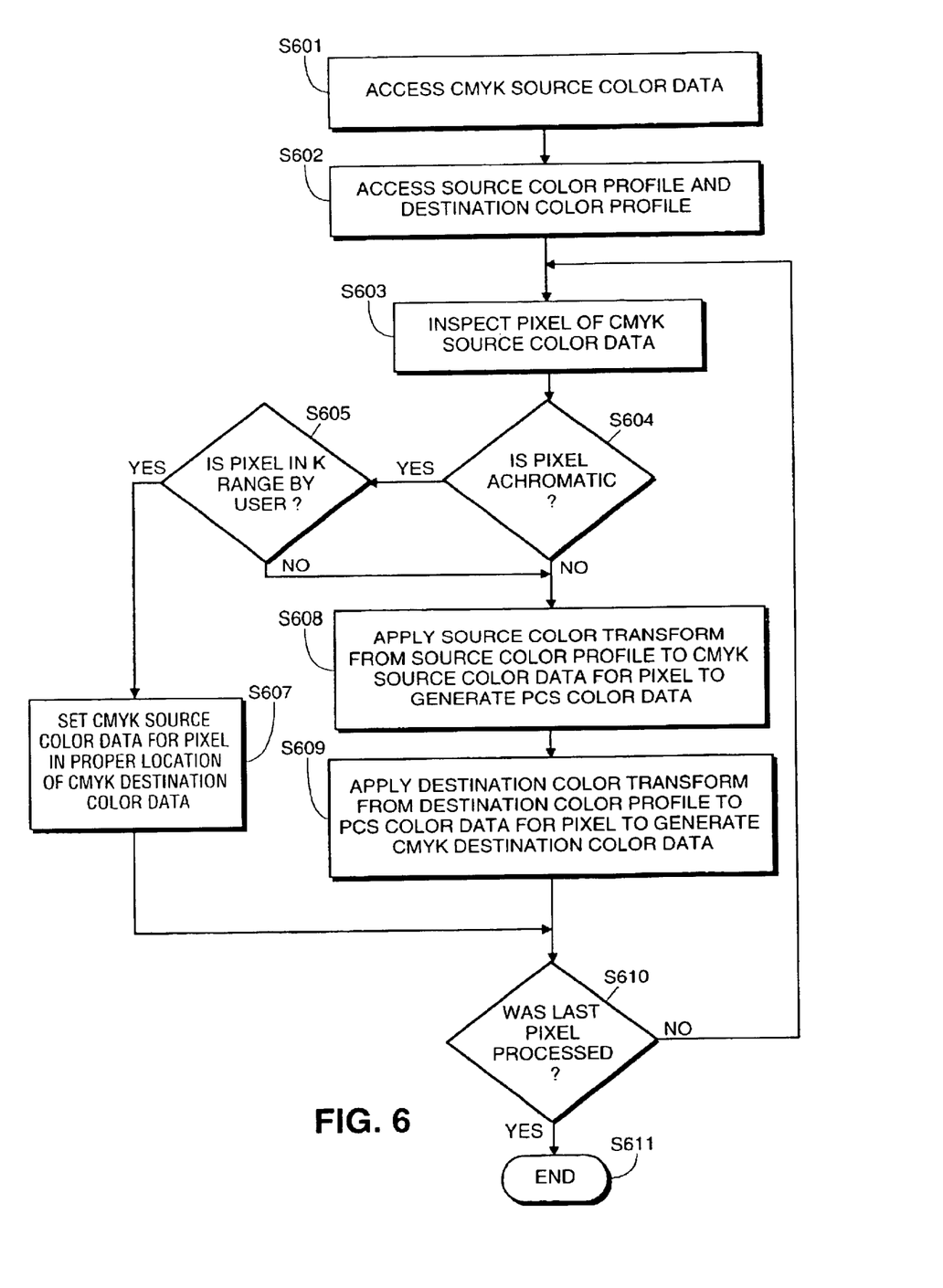
FIG. 6 is a flowchart for providing a detailed explanation of a color management system according to one embodiment of the invention.

FIG. 6 provides a flowchart for explaining one embodiment of the present invention. In step S601, CMYK source color data is accessed for color management according to the present invention. Next, a source color profile and a destination color profile are accessed in step S602. CMYK source color data is then processed on a pixel-by-pixel basis, wherein a pixel of CMYK source color data is inspected to obtain values for the C, M, Y and K color components for that pixel (step S603). It is then determined whether the pixel is achromatic, whereby the values for the C, M and Y color components are each equal to zero (step S604). If it is determined that the pixel being processed is achromatic in step S604, flow passes to step S605, in which it is determined whether the user of the color management system has provided a range of values for the K color component which the user wants to bypass the normal transformation sequence. For example, the user may only want to bypass those achromatic pixels representing a pure white color wherein C=M=Y=K=0, or a pure black color wherein C=M=Y=0 and K=100%. In such an example, the K range provided by the user in step S605 would be K=0 or K=100%, as the case may be. On the other hand, the user may wish that all achromatic pixels, from white to black, should be bypassed around the normal transformation sequence. In such an example, the K range provided by the user would be from 0 to 100* K.

If it is determined in step S605 that the achromatic pixel is within the K range designated by the user, flow passes to step S607 in which the CMYK source color data corresponding to the pixel is set into the proper, corresponding location of the CMYK destination color data. Flow then proceeds to step S610.

If, on the other hand, the pixel being processed is determined not to be achromatic, where the C, M or Y color component has a non-zero value, flow passes to step S608. In addition, in the case that the pixel being processed is determined to be achromatic in step S604, but is also determined not to be within the range of "K" values set by the user in step S605, then flow also passes to step S608. In step S608, the source color transform is obtained from the source color profile and applied to the CMYK source color data corresponding to the pixel being processed in order to generate PCS color data for that pixel. Next, in step S609, the destination color transform is obtained from the destination color profile and applied to the PCS color data for the pixel being processed in order to generate CMYK destination color data for that pixel.

In this manner, each pixel of CMYK source color data is either determined to be achromatic and passed around the normal color transformation sequence directly into the CMYK destination color data, or is transformed according to the normal color transformation sequence for generating CMYK destination color data for that pixel. The present invention therefore controls color management of each pixel so as to consistently maintain achromatic pixels during the generation of CMYK destination color data.

Flow then passes to step S610, where it is determined whether the last pixel of CMYK source color data has been processed. If the last pixel has been processed, flow passes to step S611, which is the end of the process. If the last pixel has not been processed, flow passes to step S603, upon which steps S603 through S610 are repeated.

Figure 7:
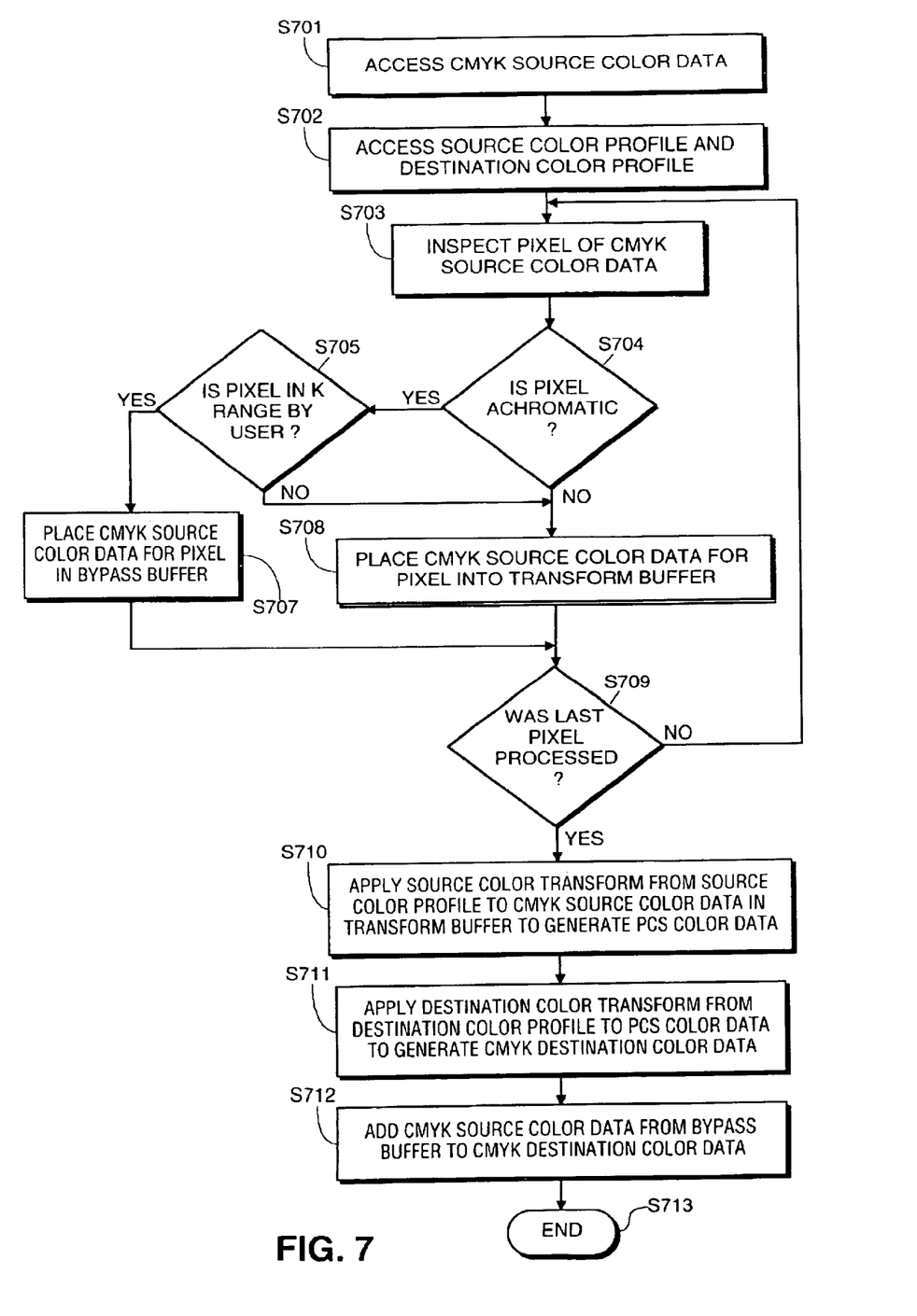
FIG. 7 is a flowchart for providing a detailed explanation of a color management system according to another embodiment of the invention.

FIG. 7 provides a flowchart for explaining another embodiment of the present invention, whereby all pixels of the color data are inspected and determined to be achromatic or non-achromatic prior to the application of a color management transformation sequence. In step S701, CMYK source color data is accessed for color management according to the present invention. Next, a source color profile and a destination color profile are accessed in step S702. CMYK source color data is then sorted on a pixel-by-pixel basis prior to transformation of any of the pixels, wherein a pixel of CMYK source color data is inspected to obtain values for the C, M, Y and K color components for that pixel (step S703). It is then determined whether the pixel is achromatic, wherein the values for the C, M and Y color components are each equal to zero (step S704). If it is determined that the pixel being processed is achromatic in step S704, flow passes to step S705, in which it is determined whether the user of the color management system has provided a range of values for the K color component which the user wants to bypass the normal transformation sequence. For example, the user may only want to bypass those achromatic pixels representing a pure white color wherein C=M=Y=K=0, or a pure black color wherein C=M=Y=0 and K=100%. In such an example, the K range provided by the user in step S705 would be K=0, or K=100% as the case may be. On the other hand, the user may wish that all achromatic pixels, from white to black, should be bypassed around the normal transformation sequence. In such an example, the K range provided by the user would be from 0 to 100% K.

If it is determined in step S705 that the achromatic pixel is within the K range designated by the user, flow passes to step S707 in which the CMYK source color data corresponding to the pixel is placed into a bypass buffer. Flow then proceeds to step S709.

If, on the other hand, the pixel being processed is determined not to be achromatic, wherein the C, M or Y color component has a non-zero value, flow passes to step S708. In addition, in the case that the pixel being processed is determined to be achromatic in step S704, but is also determined not to be within the range of "K" values set by the user in step S705, then flow also passes to step S708. In step S708, the CMYK source color data corresponding to the pixel being processed is placed into a transform buffer for future transformation. Flow then passed to step S709 in which it is determined whether the last pixel of the CMYK source color data has been processed. If there are remaining pixels to be processed, flow passes to step S703 upon which steps S703 through steps S709 are repeated. If the last pixel has been processed, flow passes to step S710.

In step S710, the source color transform is obtained from the source color profile and applied to the CMYK source color data in the transform buffer in order to generate PCS color data. Next, in step S711, the destination color transform is obtained from the destination color profile and is applied to the PCS color data in order to generate CMYK destination color data. Flow then proceeds to step S712 in which the CMYK source color data from the bypass buffer is added to the CMYK destination color data from the transformation sequence, wherein the CMYK source color data from the bypass buffer is added into appropriate pixel locations of the CMYK destination color data. Flow then passes to the end of the process in step S713.

In this manner, every pixel of CMYK source color data is either determined to be achromatic and placed in bypass buffer, or is placed in a transform buffer. Once all pixels of the color data have been designated in this fashion, the pixels in the transform buffer are transformed according to the normal color transformation sequence. The pixels in the bypass buffer are then added, unchanged in color, to the pixels processed by the color transformation sequence. The present invention therefore controls color management of each pixel so as to consistently maintain achromatic pixels during the generation of CMYK destination color data.

The present invention therefore provides a color management system in which CMYK color data from a CMYK source color space is transformed into CMYK destination color data in a CMYK destination color space, without transforming those portions of the CMYK source color data for which the values of the C, M and Y components are each equal to zero. In this manner, the representation of black, gray and white color pixels by the "K" component of the color data is preserved in a consistent manner between the source CMYK color data and the destination CMYK color data. This preservation of the representation of black, gray and white pixels is advantageous when rendering black text and/or objects, such as lines. Accordingly, black ink is used to render the color image by the destination device in a same manner as it is used by the source device to render the image, because the K component of the color data being rendered is maintained for achromatic pixels. The present invention therefore provides for the consistent appearance of a black, gray and/or white pixels, such as black text and objects, between a source device and a destination device while reducing the introduction of unwanted color hues and incorrect contrast effects.

The invention has been described with respect to particular illustrative embodiments. It is to be understood that the invention is not limited to the above-described embodiments and that various modifications may be made by those of ordinary skill in the art without departing from the spirit and scope of the invention.

What is claimed is:

1. A method for managing color data to transform CMYK source color data from a source device into CMYK destination color data for rendering by a destination device, the CMYK source color data and the CMYK destination color data being comprised of pixels represented by cyan (C), magenta (M), yellow (Y) and black (K) values, said method comprising the steps of:

determining, for each pixel of the CMYK source color data, whether the pixel has a non-zero C, M or Y value;

setting, in a case that a pixel is determined not to have a non-zero C, M or Y value, the CMYK source color data corresponding to the pixel into the CMYK destination color data;

transforming, in a case that a pixel is determined to have a non-zero C, M or Y value, the CMYK source color data corresponding to the pixel from a source device color space into CMYK destination color data in a destination device color space, and accessing a source color profile containing a source color transform and a destination color profile containing a destination color transform, wherein the source color transform and the destination color transform are used in the transforming step to transform the CMYK source color data into the CMYK destination color data;

wherein, in the transforming step, the source color transform is applied to the CMYK source color data corresponding to the pixel to generate device-independent color data in a device-independent color space, and the destination color transform is applied to the device-independent color data to generate the CMYK destination color data in the destination device color space.

2. A method for managing color data according to claim 1, wherein, in the case that a pixel is determined not to have a non-zero C, M or Y value, the CMYK source color data corresponding to the pixel is set into the CMYK destination color data as a determination is made for each pixel of the CMYK source color data.

3. A method for managing color data according to claim 1, wherein, in the case that a pixel is determined not to have a non-zero C, M or Y value, the CMYK source color data corresponding to the pixel is set into the CMYK destination color data after a determination is made for all pixels of the CMYK source color data.

4. A method for managing color data according to claim 1, wherein, in the case that a pixel is determined not to have a non-zero C, M or Y value, the CMYK source color data corresponding to the pixel is prohibited from being transformed into the destination device color space.

5. A method for managing color data according to claim 1, wherein in the setting step, the CMYK source color data corresponding to the pixel is not set into the CMYK destination color data unless the K value of the CMYK source color data corresponding to the pixel is within a predetermined range of values.

6. A method for managing color data according to claim 5, wherein the predetermined range of values is obtained from a user input.

7. A method for managing color data to transform CMYK source color data from a source device into CMYK destination color data for rendering by a destination device, the CMYK source color data and the CMYK destination color data being comprised of color pixels represented by cyan (C), magenta (M), yellow (Y) and black (K) values, said method comprising the steps of:

accessing a source color profile and a destination color profile, the source color profile containing a source color transform and the destination color profile containing a destination color transform;

determining, for each pixel of the CMYK source color data, whether the pixel has a non-zero C, M or Y value;

setting, in a case that a pixel is determined to not have a non-zero C, M or Y value, the CMYK source color data corresponding to the pixel into the CMYK destination color data; and transforming, in a case that a pixel is determined to have a non-zero C, M or Y value, the CMYK source color data corresponding to the pixel from a source device color space into CMYK destination color data in a destination device color space, wherein, in the transforming step, the source color transform is applied to the CMYK source color data corresponding to the pixel to generate device-independent color data in a device-independent color space, and the destination color transform is applied to the device-independent color data to generate the CMYK destination color data.

8. An apparatus for managing color data to transform CMYK source color data from a source device into CMYK destination color data for rendering by a destination device, comprising:

a program memory for storing process steps executable to perform a method according to any of claims 1 to 4 and 5 to 7; and a processor for executing the process steps stored in said program memory.

9. Computer-executable process steps stored on a computer readable medium, said computer-executable process steps for managing color data to transform CMYK source color data from a source device into CMYK destination color data for rendering by a destination device, said computer-executable process steps comprising process steps executable to perform a method according to any of claims 1 to 4 and 5 to 7.

10. A computer-readable medium which stores computer-executable process steps, the computer-executable process steps to manage color data to transform CMYK source color data from a source device into CMYK destination color data for rendering by a destination device, said computer-executable process steps comprising process steps executable to perform a method according to any of claims 1 to 4 and 5 to 7.

* * * * *